(No Model.) 4 Sheets—Sheet 2.
N. A. PHILLIPS.
GEAR CASE.
No. 601,733. Patented Apr. 5, 1898.
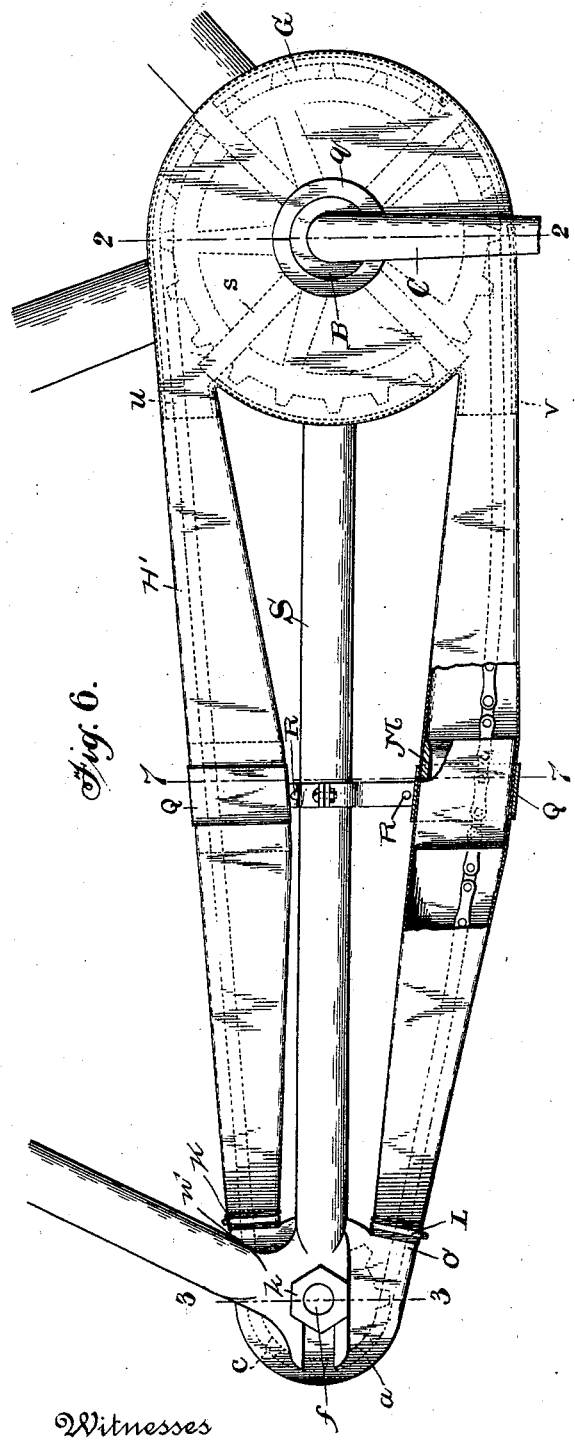
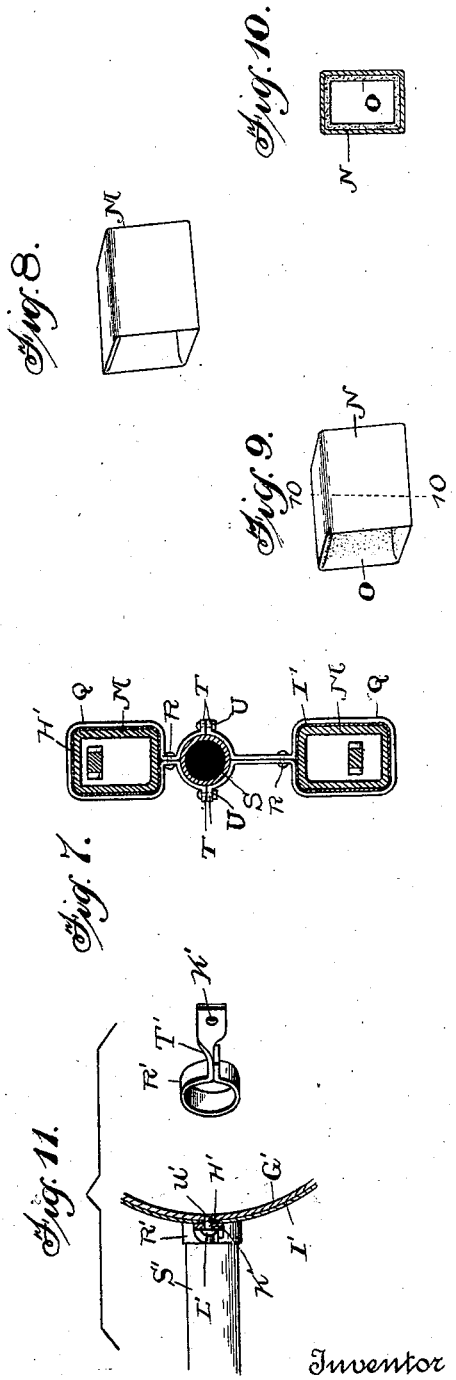
Witnesses
Wm. F. Doyle.
A. E. Marschalk.
Inventor
Norman A. Phillips
by Chandlee & Chandlee
Attorneys

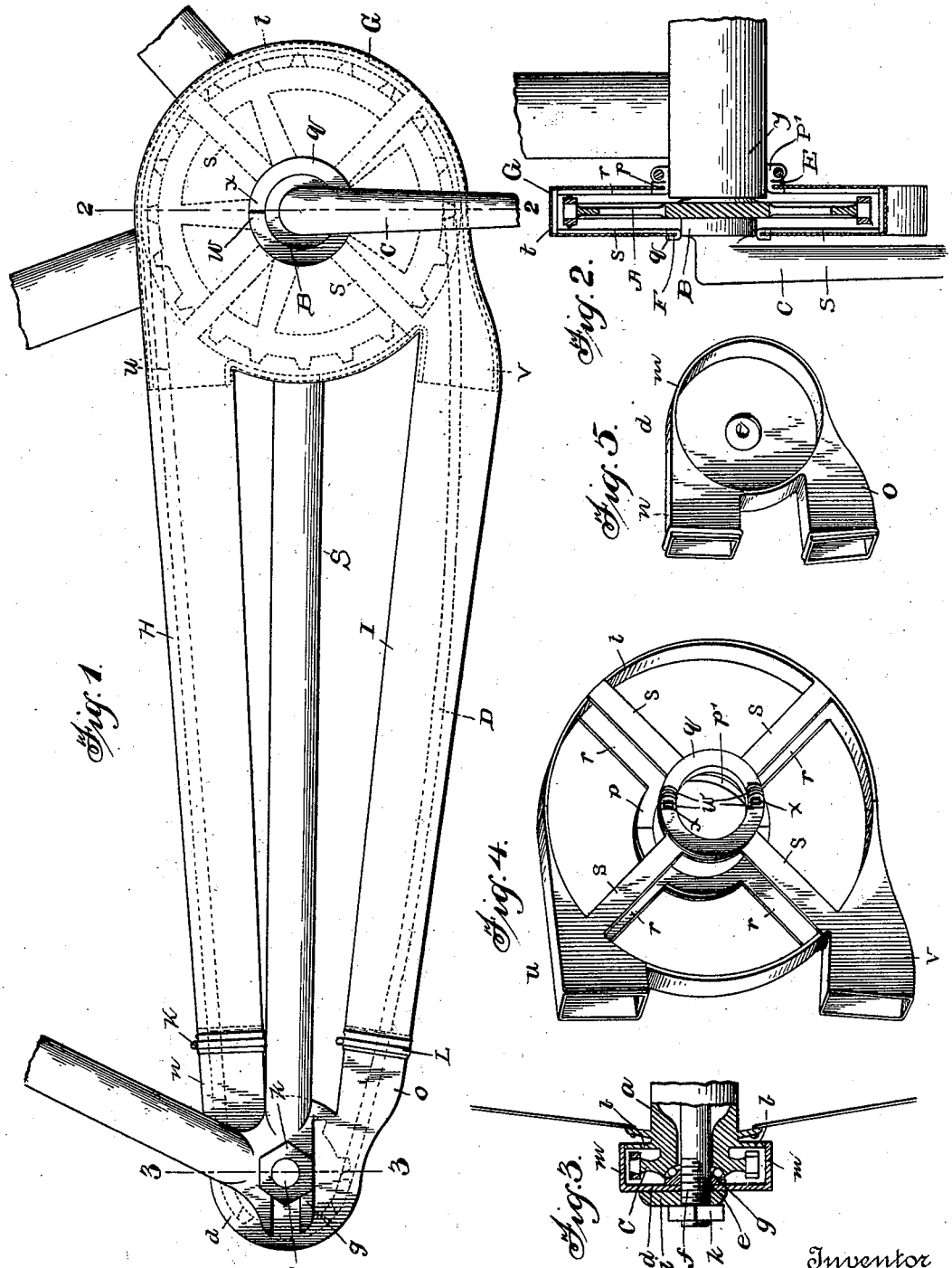

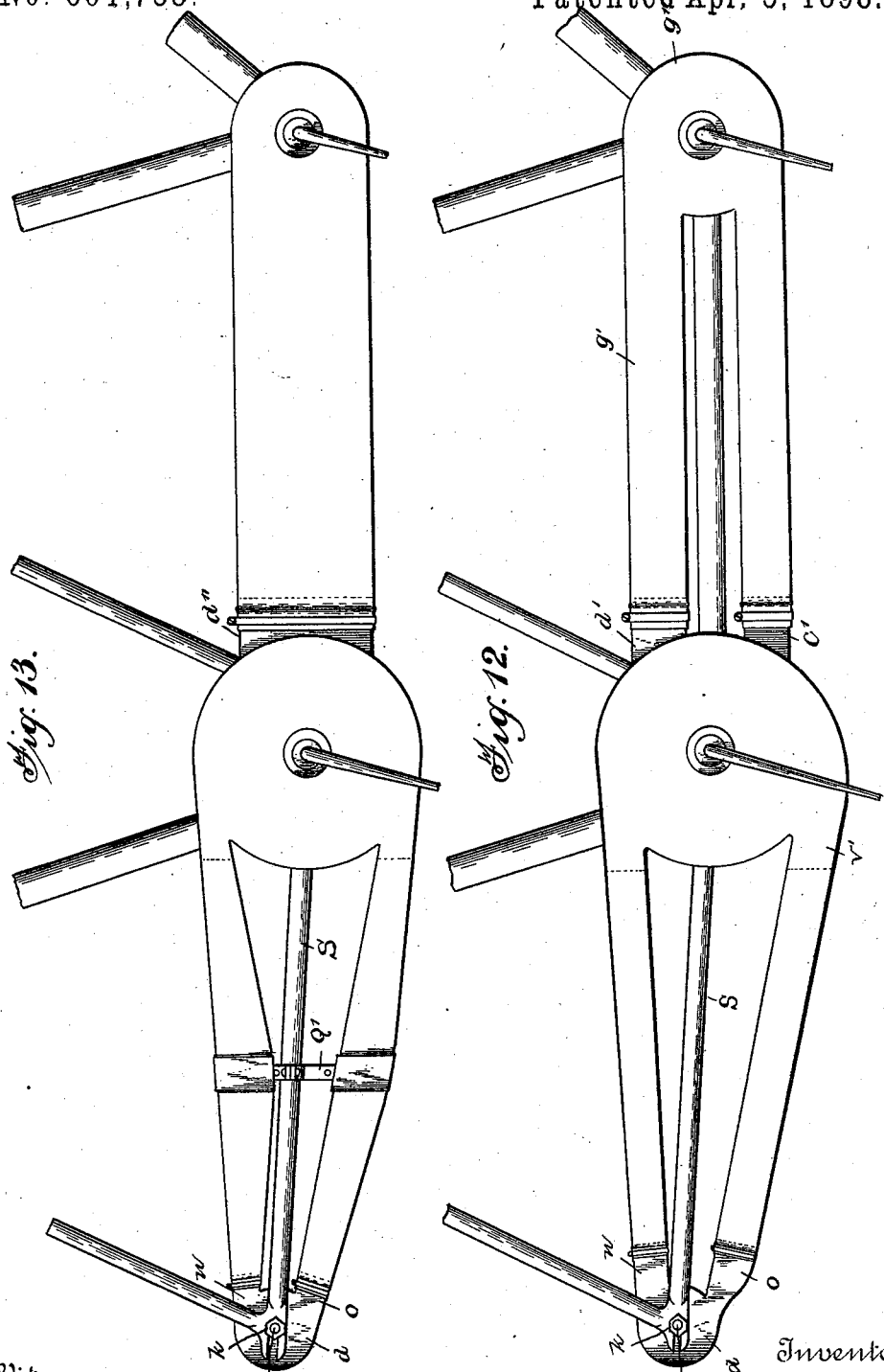

(No Model.)  4 Sheets—Sheet 4.
N. A. PHILLIPS.
GEAR CASE.
No. 601,733.  Patented Apr. 5, 1898.
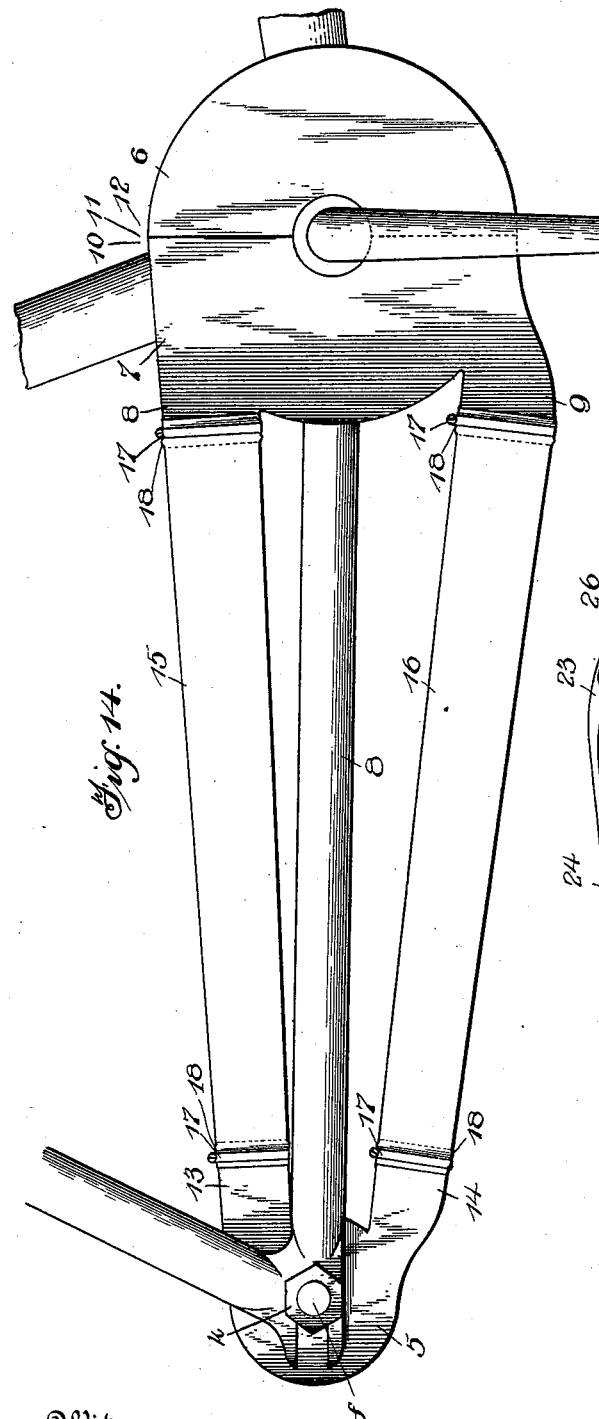
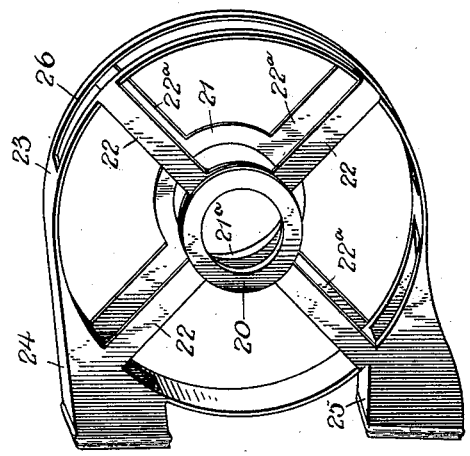
Witnesses
Wm. F. Doyle.
A. E. Marschalk.
Inventor
Norman A. Phillips,
by Chandler & Chandler
Attorneys
THE NORRIS PETERS CO., PHOTO-LITHO., WASHINGTON, D. C.

UNITED STATES PATENT OFFICE.

NORMAN A. PHILLIPS, OF NEW CASTLE, PENNSYLVANIA, ASSIGNOR TO THE FROST GEAR CASE COMPANY, OF NEW YORK, N. Y.

GEAR-CASE.

SPECIFICATION forming part of Letters Patent No. 601,733, dated April 5, 1898.

Application filed January 19, 1897. Serial No. 619,803. (No model.)

*To all whom it may concern:*

Be it known that I, NORMAN A. PHILLIPS, a citizen of the United States, residing at New Castle, in the county of Lawrence, State of Pennsylvania, have invented certain new and useful Improvements in Gear-Cases; and I do hereby declare the following to be a full, clear, and exact description of the invention, such as will enable others skilled in the art to which it appertains to make and use the same.

My invention relates to gear-cases in general, and more particularly to that class adapted for application to the chain and sprockets of a bicycle, tricycle, or similar vehicle, and has for its object to provide such a construction as will prevent contamination of the parts in question, and which will at the same time be light, ornamental, and cheap of construction, and which, moreover, will not hinder in any manner the adjustment of the rear wheel and its sprocket in tightening or loosening the chain.

In the drawings forming a portion of this specification, and in which like symbols of reference indicate similar parts in the several views, Figure 1 is a side view of a portion of a bicycle, showing the location and arrangement of the sprockets, chain, and case with respect thereto. Fig. 2 is a section on line 2 2 of Fig. 1, showing the front sprocket and its casing in section. Fig. 3 is a section on line 3 3 of Fig. 1, looking to the left and showing in section the rear sprocket and wheel-hub and adjacent portions of the frame. Fig. 4 is a perspective view showing the frame of the front sprocket-casing, over which the rubber covering is adjusted. Fig. 5 is a perspective view showing the inner side of the removable dished element of the rear sprocket-casing. Fig. 6 is a view similar to Fig. 1, showing a different form and arrangement of chain-inclosing tubes. Fig. 7 is a section on line 7 7 of Fig. 6, showing means for bracing the chain-inclosing tubes. Fig. 8 is a perspective view of one form of stiffening-lining for the chain-inclosing tubes. Fig. 9 is a view similar to Fig. 8, showing the lining having an interior coating of some suitable fabric. Fig. 10 is a section on line 10 10 of Fig. 9. Fig. 11 is a side view of a portion of one of the tie-rods of a bicycle, showing a brace secured thereto and extending to the front sprocket-casing to form an additional brace therefor, said casing, as also the covering thereof, being shown in section. Fig. 12 is a view similar to Fig. 1, showing the application of my invention to the driving mechanism of a tandem. Fig. 13 is a view similar to Fig. 12, showing the construction indicated in Fig. 6 of the drawings applied to the rear chain of a tandem, a single elastic tube being employed as a covering for the front sprocket and free chain-sections. Fig. 14 is a view similar to Figs. 1 and 6, showing the front sprocket-casing formed entirely of metal and having elastic chain-inclosing tubes attached to the tubular extensions thereof. Fig. 15 is a view similar to Fig. 4, showing an alternative form of front sprocket-frame.

Referring now to the drawings, in operating in accordance with this invention there is formed upon or secured to the hub $a$ of the rear wheel of a bicycle or similar vehicle an annular flange $b$, forming one element of a casing inclosing the adjacent rear sprocket $c$ of the machine, which latter is secured to or formed upon the said hub in the usual manner.

To complete the casing for the rear sprocket, I form a disk-shaped plate $d$, having a central perforation $e$, adapted to receive the axle $f$ of the rear wheel, the inner face of the plate engaging the outer face of the adjacent bearing-cone $g$ of the rear wheel, against which it is securely clamped through the medium of the adjacent portion $i$ of the rear fork, the usual clamping-nut $k$ being screwed upon the threaded end of the axle exterior of said fork to maintain this clamping action.

The flange $m$ of the disk-shaped plate $d$ is arranged to project over the periphery of the rear sprocket and is of such extent as to inclose the flange $b$ of the hub $a$, to which it approaches so closely as to form practically a dust-proof joint.

Formed in the face of the flange $m$ in the direction of the front sprocket are openings, leading from which are tubular projections $n$ and $o$, concentric with the upper and lower common tangents of the front and rear sprockets, the purpose of which projections will be presently explained.

Referring now to the mechanism connected with the front sprocket, as shown in Figs. 1, 2, and 4, I form a framework comprising two rings $p$ and $q$, lying in parallel planes and upon a common axis, extending radially from which are spokes $r$ and $s$, respectively, supporting a circular band $t$, having a width substantially equal to the interspace between the rings. Projecting from the band $t$ and positioned to coöperate with the projections $n$ and $o$ are tubular extensions $u$ and $v$, opening rearwardly into the inclosure of the bands, the object of which projections will be shortly described. The framework thus formed is divided, preferably vertically, into two parts, so that the extensions $u$ and $v$ will be comprised in one part, these parts in practice being held together in any desired manner, such as by means of ears $w$, formed upon the adjacent portions thereof and adapted to receive screws or bolts $x$ to hold them in engagement.

The ring $p$ has a diameter somewhat in excess of that of the ring $q$, in order that it may be fitted snugly upon the crank-hanger $y$ of the machine, said ring having a laterally-projecting flange $p'$ adjacent its inner periphery, presenting an extended surface to the crank-hanger and thus rigidly supporting the structure.

In order to apply the ring $p$ as above described, it is of course necessary to dissemble the framework and to bring the elements thereof, together with the crank-sprocket A, in position between the spokes $r$ and $s$ and the rings $p$ and $q$. When the framework is thus assembled upon the machine, the dimensions thereof are such as will cause the ring $q$ to closely encircle the axle B of the crank C. When the framework is thus in position, the extensions $u$ and $v$ thereof will be in alinement with the projections $n$ and $o$ of the rear sprocket-casing, so that the chain D of the machine arranged upon these sprockets will in passing from one to the other run through them.

The rings $p$ and $q$ are provided exteriorly of the spokes $r$ and $s$ each with a peripheral groove E and F, respectively, which grooves are adapted to receive the edges of the frame-covering.

The frame-covering, as shown in Figs. 1 and 2, consists of a disk-shaped bag G, of rubber or other suitable elastic material, which said bag is provided with axial perforations corresponding in location to the rings $p$ and $q$, the edges of the material adjacent the perforations being formed sufficiently strong to prevent tearing. In practice this bag is applied by passing the crank C through its perforations, after which the perforation in the side adjacent the sprocket is stretched and thus enlarged in order that the material may be fitted over the framework and those portions surrounding the perforations may contract and lie within the grooves E and F, the outer perforation of the bag receiving the ring $q$ and the perforations being of such diameters as to cause the said surrounding material to fit snugly within the grooves.

Extending from the bag G and formed, preferably, integral therewith are elastic tubes H and I, which tubes when the bag is in position upon its frame form continuations of the extensions $u$ and $v$ of the crank-sprocket frame and are of such lengths that when in position, as shown in Fig. 1, their extremities receive the projections $n$ and $o$ of the rear sprocket-casing, to which they may be secured by means of clamps K and L or in any other desired manner.

The vertical diameters of the extensions $u$ and $v$ are slightly in excess of the similar diameters of the projections $n$ and $o$, the tubes H and I tapering from the front casing to the rear casing correspondingly. It will be readily understood, however, that, if desired, these tubes may have constant and equal vertical diameters.

It will thus be seen that I have provided an extremely simple, light, cheap, and effective as well as an ornamental casing for both the sprockets and chain, which said casing, moreover, does not in any way interfere with the adjustment of the rear wheel and sprocket in tightening or loosening the chain, the elasticity of the chain-inclosing tubes H and I stretching or contracting during this operation and thus at all times completely covering the chain and maintaining their proper positions.

In Fig. 6 of the drawings I have shown a modification of my invention employing the same forms of sprocket-casings, but differing in the shapes of the chain-inclosing tubes, in which construction is also employed means for bracing the tubes intermediate their extremities, which means also serves to maintain their shapes. In this construction the lateral dimensions of the tubes H and I are practically constant, while the vertical diameters gradually increase from the extensions $u$ and $v$ in equal ratios until midway of their lengths, when after a short distance of constant diameter they gradually decrease until at their opposite extremities they receive snugly the projections $n'$ and $o'$ of the rear sprocket-casing.

The upper walls of the tubes H' and I' are substantially straight, the variations in vertical diameters of the tubes being attained by first diverging and then converging the lower walls with respect to the upper walls in the direction of the rear sprocket. In order to brace the tubes, as well as to maintain their shapes, I arrange therein at points intermediate their extremities rigid linings, as shown in Figs. 7, 8, 9, and 10 of the drawings, of any desired material, either of wood, as shown in Fig. 8, or of the same or different material having linings of velvet or other suitable stuff, as shown in Figs. 9 and 10. These linings not only protect the tubes against injury from the chain, but when made of wood or of metal having a soft lining make no noise when the chain comes in contact therewith.

In order to give a certain amount of rigidity to the chain-coverings and thus prevent their displacement and consequent engagement by the chain, I encircle each tube exteriorly of the linings M with metallic bands Q, which latter may be secured in place by means of rivets R or in any other desired manner, the ends of said bands extending in the direction of the adjacent tie-rod S of the machine, which tie-rod they engage and mutually encircle, their extremities T being turned outwardly to form ears, which latter are perforated and have passed through them bolts U, which when screwed up bring the adjacent ears into contact and thus firmly clamp the tie-rods.

The object of the variable diameters of the tubes H' and I' will be at once apparent when it is remembered that the drive-chain has a certain amount of sag, as also vertical vibration, under working conditions, and in thus forming the lower wall of each tube to approximately conform to this sag engagement of the tube and chain is prevented. There is also at times lateral vibration of the drive-chain under working conditions, which must be considered in a construction of this nature. When such lateral vibration occurs, however, the section of lining M will receive engagement of the chain and thus prevent noise, as well as injury to the casing.

Referring now to Fig. 11 of the drawings, to give greater rigidity to the inclosure of the front sprocket the tie-rod S' may be encircled by a band R', secured thereon in any desired manner, one extremity of said band being given a quarter-turn at T' and extended to a point adjacent the periphery of the said inclosure. A threaded perforation U' is formed in the band G' of the framework and concentrically therewith, and exteriorly of said band is arranged a washer H', fitting a perforation in the rubber covering I'. The band R' lies upon the washer H' and is provided with a perforation K', formed in alinement with those of the washer H' and band G', through which perforations is passed a screw L' to hold the elements in engagement. It will be readily understood that similar bracing means may be applied to the bottom bar and seat-tube of the machine, if desired.

Referring now to Fig. 12 of the drawings, in which is shown my invention as applied to a tandem, the casing for the rear crank-sprocket is formed in the same manner as that for the front sprocket of a bicycle, with the exception that the band of the casing-frame is provided with a second pair of extensions $c'$ and $d'$, which latter are arranged to receive the front drive-chain in passing from the front crank-sprocket to the corresponding rear crank-sprocket. The framework of the front sprocket-casing is identical with that of the crank-sprocket of a bicycle, and connecting these two crank-sprocket casings is a rubber or other elastic chain-covering $g'$, in the form of tubular extensions of a disk-shaped bag $g''$, applied to the front sprocket-casing as in connection with a bicycle. In this view I have shown a cam-shaped casing for the rear crank-sprockets, the object of which shape is to bring the lower rear extension $v'$ sufficiently low to correspond to the position of the drive-chain.

In Fig. 13 of the drawings is shown a different embodiment of my invention applied to a tandem, in which the rear chain-tubes are of varying vertical diameters and are provided with a brace Q', which features are similar to those shown in Fig. 6 of the drawings and described in connection therewith.

In Fig. 13 of the drawings I have further shown the front chain-covering formed of a single tube, one end of which is closed and covers the front sprocket. A single extension $d''$ is formed upon the rear crank-sprocket casing to receive the rear end of the tube which incloses both free chain-sections.

In Fig. 14 of the drawings I have shown a construction in which the rear sprocket-casing $b$ is the same as that shown in Fig. 1 of the drawings, the crank-sprocket casing being formed in two parts 6 and 7, one part, 7, thereof being provided with the usual rear extensions 8 and 9. This casing is made entirely of metal and is assembled from opposite sides of the periphery of the sprocket, the meeting edges of said casing being secured together in any desired manner, such as through the medium of ears 10 and 11, provided with alining perforations, through which a bolt or screw is passed. Secured to the extensions 13 and 14 of the rear sprocket-casing 5 and having their opposite extremities fastened to the extensions 8 and 9 of the front casing are elastic tubes 15 and 16, held in place through the medium of clamping-bands 17 or in any other desired manner, the said extensions being provided, preferably, with flanges 18 to prevent withdrawal of the tubes therefrom. It will thus be seen that in this embodiment of my invention I secure the same elastic adjustment as in the construction heretofore described and produce a somewhat more rigid casing for the front sprocket.

In Fig. 15 of the drawings is shown an alternative form of front sprocket-frame for the rubber casings, which frame comprises rings 20 and 21, arranged in parallel planes and on a common axis, extending radially from which are spokes 21 and 22, respectively, which said spokes are provided with an encircling band 23, having tubular projections 24 and 25, opening rearwardly into the inclosure thereof, said band 23 having cut therefrom within its edge an arc-shaped piece whose chord is greater than the diameter of the front sprocket, the removal of said piece resulting in the formation of a slot 26, having such dimensions as to permit the passage of the sprocket therethrough, whereby it may be caused to assume a position with its axis coincident with the common axis of the rings 19 and 20. In order to hold this device in place, the ring 19 may be provided with a flange 21, extending outwardly from its inner periphery and adapted to embrace the crank-hanger in the same manner as does the flange $p'$ described in connection with Figs. 3 and 4.

It will be readily understood that I may employ any desired form, construction, and arrangement of the front sprocket-casing and that the same remarks are true with respect to the rear sprocket-casing, with the exception that the latter must be adjustable with the rear sprocket, and, moreover, that I may employ as a covering for the chains a single tube or individual tubes of any desired shape and material, with the exception that such tubes must be wholly or in part of elastic material.

I am aware of British Letters Patent No. 15,701, dated July 15, 1896, and I do not claim anything therein shown or described.

I claim and desire to secure by Letters Patent—

1. In a bicycle or similar vehicle, the combination with sprockets and intermediate motion-transmitting means, of a frame inclosing one of said sprockets and provided with openings through which the transmitting means passes, an elastic covering closely fitting the frame, openings in the covering registering with those of the frame, a casing for the second sprocket having openings through which the transmitting means passes and elastic material intermediate the frame and casing, secured thereto and inclosing the transmitting means.

2. In a bicycle or similar vehicle the combination with front and rear sprockets and intermediate means for transmitting motion, the sprockets being correlatively adjustable, of a frame inclosing the front sprocket, openings in the frame through which the transmitting means passes, elastic material fitted upon the frame and having tubular extensions corresponding in location with their respective openings in the frame and inclosing the motion-transmitting means, and a casing for the rear sprocket having openings through which the transmitting means passes, the said tubular extensions being secured to the casing.

3. In a bicycle or similar vehicle, the combination with the front and rear sprockets and adjacent tie-rod, of casings for the sprockets, flexible tubes intermediate the casings and inclosing the free chain-sections, rigid linings within the tubes intermediate their extremities, and clamps engaging the tubes exteriorly of the linings, said clamps having connection with the tie-rod.

4. In a device of the class described the combination with a sprocket of an inclosing frame comprising rings having radiating spokes, and a band secured to the spokes and encircling the rings, said band having an opening adapted for the passage of the sprocket therethrough.

5. In a device of the class described, a frame comprising rings having peripheral grooves and radiating spokes, said rings lying in parallel planes and upon a common axis, a band secured to said spokes and encircling the rings, openings in the band terminating in tubular extensions and an additional opening in the band.

6. A sprocket-casing comprising a frame having an elastic covering said frame comprising rings and a band supported thereby and openings in the covering corresponding to those of the rings, the material surrounding the openings of the covering lying upon the rings.

7. A sprocket-casing comprising a frame having an elastic cover, said frame comprising rings and a band supported thereby, said rings having peripheral grooves, openings in the covering corresponding to those of the rings, the material surrounding said openings lying within the grooves of the latter.

8. In a bicycle or similar vehicle the combination with the driving-wheel and the driven wheel of a suitable motion-transmitting device, and a casing for one of said wheels consisting of a rigid frame suitably perforated for the passage of said motion-transmitting device and formed of separable parts including a grooved ring located upon one side of the driving-wheel, an exterior covering of soft elastic rubber having one edge suitably supported at or upon one side of the wheel and its other edge contracted in or upon said grooved ring, substantially as described.

9. In a bicycle or similar vehicle the combination with the driving-wheel, the driven wheel and a suitable motion-transmitting device, of a covering for one of said wheels consisting of a metal frame attached to the vehicle, said frame having tubular extensions for the passage of the motion-transmitting device, and an elastic flexible box or case having substantially the same form or outline as said frame and corresponding tubular extensions, said elastic flexible case inclosing and contracting upon said metal frame, substantially as described.

In testimony whereof I affix my signature in presence of two witnesses.

NORMAN A. PHILLIPS.

Witnesses:
TENNEY ROSS,
GEO. CHANDLEE.